United States Patent [19]

Ytter

[11] E Re. 30,777

[45] Reissued Oct. 20, 1981

[54] PORTABLE DISPLAY SYSTEM

[75] Inventor: Willy Ytter, Stockholm, Sweden

[73] Assignee: Extraversion, Inc., Dover, Del.

[21] Appl. No.: 87,992

[22] Filed: Oct. 25, 1979

Related U.S. Patent Documents

Reissue of:

[64] Patent No.: 4,147,198
Issued: Apr. 3, 1979
Appl. No.: 838,667
Filed: Oct. 3, 1977

[51] Int. Cl.[3] ..... A47G 5/00

[52] U.S. Cl. ..... 160/135; 160/351

[58] Field of Search ..... 160/135, 201, 229 R, 160/351, 381; 211/149, 186, 188, 195, 198, 199; 248/174, 450, 459, 460

[56] References Cited

U.S. PATENT DOCUMENTS

| | | | |
|---|---|---|---|
| 1,282,685 | 10/1918 | Goldhahn | 160/135 |
| 2,101,349 | 12/1937 | Sharp | 160/381 |
| 2,723,820 | 11/1955 | Schulz et al. | 248/174 |
| 2,989,788 | 6/1961 | Kessler | 160/381 |
| 3,341,180 | 9/1967 | Dashio | 160/201 |
| 3,356,403 | 12/1967 | Sak et al. | 160/135 |
| 3,592,289 | 7/1971 | Aysta | 160/381 |
| 3,601,916 | 8/1971 | Epstein | 160/135 |
| 3,605,851 | 9/1971 | Miles et al. | 160/135 |
| 3,700,385 | 10/1972 | Sherwood | 160/135 |
| 3,768,222 | 10/1973 | Birum, Jr. | 160/135 |
| 3,788,378 | 1/1974 | Sobel | 160/351 |
| 3,913,656 | 10/1975 | Guyer | 160/135 |
| 3,987,838 | 10/1976 | La Gue et al. | 160/135 |
| 4,077,160 | 3/1978 | Stewart | 160/381 |

FOREIGN PATENT DOCUMENTS

| | | | |
|---|---|---|---|
| 20319 | of 1895 | United Kingdom | 160/135 |

*Primary Examiner*—Kenneth Downey
*Attorney, Agent, or Firm*—Wolf, Greenfield & Sacks

[57] ABSTRACT

A portable display system having a plurality of hollow panel assemblies with each comprising two parallel and facing wall boards secured within a border strip device. Eight panel assemblies are hinged together to fold and unfold between a folded position in which all eight panel assemblies are in parallel stacked relation and an unfolded position in which the panels are opened in a continuous wall configuration.

30 Claims, 13 Drawing Figures

PORTABLE DISPLAY SYSTEM

Matter enclosed in heavy brackets [ ] appears in the original patent but forms no part of this reissue specification; matter printed in italics indicates the additions made by reissue.

BACKGROUND OF THE INVENTION

Today's competition requires that many businesses display their wares at trade shows, symposiums, and the like. The wares are often attractively displayed in booths or stalls together with advertising literature and the like.

Most display stalls presently in use consist of basically two types. One is a rather large, heavy display that is structurally sound but which requires extensive on-site preparation and is difficult to transport. The other display system is the type that is carried by a salesman and thus is lightweight, but which does not lend itself to large display requirements. Both systems have limited versatility of use. The more permanent display system is not ordinarily assembled and disassembled with ease, while the portable ones are not often structurally sound or sufficiently large to define a significant area of display. Neither system is ordinarily versatile with respect to possible display configurations.

Several patents exemplify the prior art. Wilson, U.S. Pat. No. 956,252 shows a display folder having foldable members which are creased on opposite faces and secured together at their creases by a securing means. In Wiltz, U.S. Pat. No. 1,076,257 is shown an amusement device having a flat square member divided by perpendicular lines into four corners, and four hinged panels, each panel being hinged at one edge along one of the perpendicular lines. In Swanson, U.S. Pat. No. 3,269,043, a display device is shown having a plurality of panels and stiffener plates which are covered by a cloth covering which foldably connects the stiffener plates together, width edge to width edge, to provide a string of rectangular panels. In Rhude, U.S. Pat. No. 3,325,934 is shown a portable display case for storing, transporting and displaying visual aid materials. In R. E. Hartz, U.S. Pat. No. 3,481,060, a vehicle sign assembly is shown having a plurality of inter-leaved hinged placards on small parallel hinged axes.

BRIEF DESCRIPTION OF THE INVENTION

The present invention comprises a folding display system in which the walls of the system are hinged together so that they may be opened and closed into various display configurations. When closed, the entire display case is similar in appearance to a suitcase, and affords the user a highly portable display device. When fully opened, the display system is configured in the shape of a substantially high wall of approximately six feet, with a width of approximately eight feet. It can be appreciated by those skilled in the art that the display device described herein is not limited to a six by eight foot dimension but in fact may be larger or smaller depending upon the user's needs. The display system may be partially opened or closed to cover a shorter or narrower display area, as needed. For asthetic reasons, the display can be formed in the shape of an accordion, or may be formed in numerous other configurations which are apparent to those skilled in the art.

The versatility of the present display system in being able to form displays of various sizes and configurations and yet be highly portable is achieved by use of a unique configuration of light-weight wall boards, hinging devices, and border strip means to hold and support the boards and hinges in a precise structural arrangement.

In the preferred embodiment described herein there are eight panel assemblies comprising the present display system. Each panel has a front surface board and a rear surface board which are held together by border strip means. The border strip means are positioned to completely surround the perimeter of each panel assembly. Additionally, the border strip means provide a panel assembly which is structurally sound and relatively light-weight since the interior portion of the panel assembly between the front surface board and rear surface board is hollow. The front and rear surface boards are lightweight and strong panels which, in a preferred embodiment, are approximately three feet high and two feet wide.

The various panel assemblies are hinged together in a specific arrangement to form two panel assembly groups. In a preferred embodiment described herein, each panel assembly group is identical in size and configuration to the other. Each group consists of four panel assemblies arranged in a rectangular configuration when fully opened. When partially opened, each panel assembly group appears rectangular, having half the width of the fully opened group. Thus, each panel assembly group closes along an edge representing the vertical bisector of the rectangle. To completely close each panel assembly group, the upper panel assembly is lowered to meet the lower panel assembly. When completely closed, each panel assembly group is a rectangle one-fourth the size of the completely open panel assembly group. Thus, when fully closed, each panel assembly group is the size of one panel assembly in height and width.

Although the preferred embodiment shows two panel assembly groups, it can be appreciated by those skilled in the art that a plurality of panel assembly groups may be utilized for specific applications. This can be accomplished by either hinging several panel assembly groups together, or by providing detachable connecting means so that each display system can be detached or connected to each other to form a display system of several panel assembly groups. Further, it can be appreciated that the panel assembly groups need not all be of the same size.

As can be seen, the above described display system is not only useful for displaying one's goods or business wares, but it is also useful in the entertainment field for quick fabrication of sets and backdrops. An added advantage of this display system is that it can be folded into a suitcase configuration and carried off easily. The fully opened, fully closed positions described above for each panel assembly group can be altered to suit the user's needs. Thus, various display systems can be established by altering the arrangement of panel assemblies.

The border strip means comprises basically two types of strips, each of which have mitered corners which form a neat and smooth corner connection. For those edges of the panel assemblies to which a hinging device is attached, a border strip having a slot along its outermost surface is utilized. Inserted into the border strip slot are holding inserts to which the hinging devices are connected. For those edges of the panel assemblies that have no hinging devices attached to them, a border strip device is utilized which has an area or slot to attach each panel with supporting center means and does not have a slot for the hinging devices.

Along the upper horizontal edges of each panel assembly is used a non-hinging border strip device whose outermost portion is detachable from its center support portion. The outermost portion is the elongated strip visable to a viewer which encloses the exposed edges of both wallboards of each panel assembly. The detachable nature of the upper edge border strip device provides for easy insertion and removal of each wallboard into the remaining three-sided border strip frame. Thus, the wallboards forming the front and rear surfaces of each panel assembly can be easily removed and inserted with new wallboards containing new display information. This feature allows the display system to be flexible in that several themes of display can be displayed merely by changing the wall boards within the device. A more detailed description of the border strip devices is set forth below.

DETAILED DESCRIPTION OF THE INVENTION

Figure 1A:
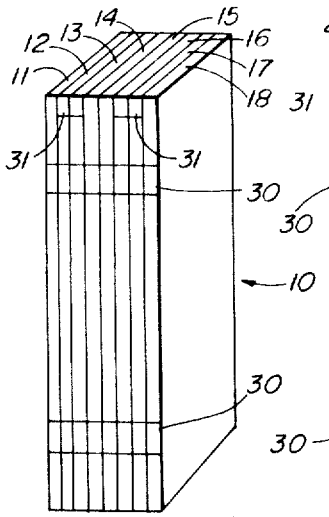
FIG. 1A is a perspective view of the display system device in its closed position.
Figure 1B:
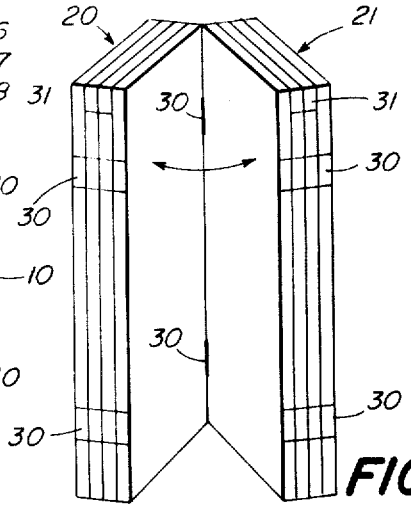
FIG. 1B is a perspective view of the display system device showing two panel assembly groups, each in a substantially closed position.

In FIG. 1A is shown the panel display system, shown generally as 10, having eight panel assemblies 11 through 18 inclusive, in a completely closed position. FIG. 1B shows the panel display system 10 partially opened to form two panel assembly groups, shown generally as 20 and 21. Panel assembly group 20 comprises panel assemblies 11, 12, 13 and 14, and similarly, panel assembly group 21 comprises panel assemblies 15, 16, 17 and 18. It can be appreciated by those skilled in the art that each panel assembly group may consist of more than four panel assemblies.

In FIG. 1A through 1F is shown various hinging devices 30 and 31, which allow the display system 10 to open in accordance with the sequence protrayed in FIGS. 1A through 1F. The hinging devices 30 and 31 along with their corresponding border strip devices, will be explained in greater detail below.

Figure 1C:
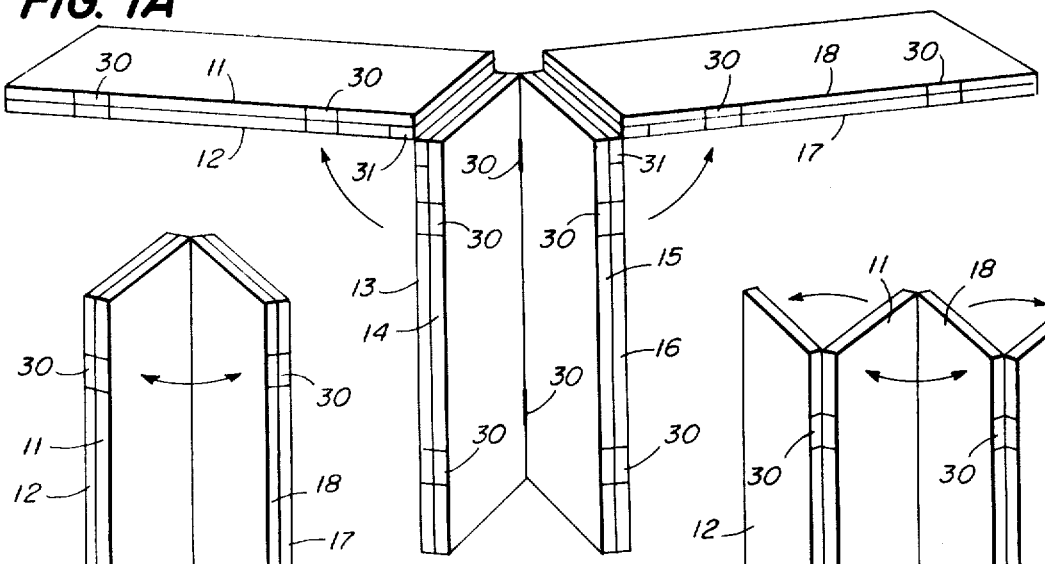
FIG. 1C is a perspective view of the panel display system, having each panel assembly group partially opened.
Figure 1D:
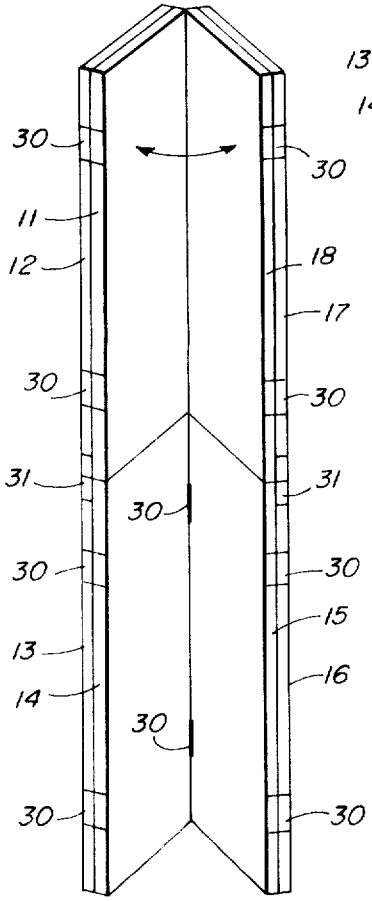
FIG. 1D is a perspective view of the panel display system having each panel assembly group opened to a greater extent than that shown in FIG. 1C.
Figure 1E:
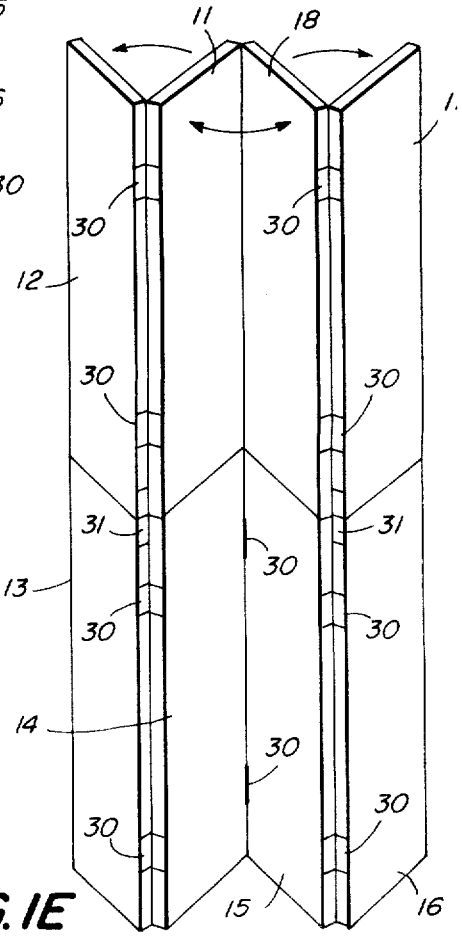
FIG. 1E is a perspective view of the panel display system wherein each panel assembly group is opened to form an accordion type display system.

To increase the size of the display arrangement shown in FIG. 1B, panel assemblies 11 and 12 of group 20, as well as panel assemblies 17 and 18 of group 21 are shown in their movable state in FIG. 1C. These panel assemblies, 11, 12, 17 and 18 can be raised to a vertical position as shown in FIG. 1D. The panel assembly arrangement in FIG. 1D provides a display system wherein height and not width is the desired display requirement. To open the panel assemblies further, assemblies 12, 13 and 17, 16 can be moved outward. This so-called accordion style panel arrangement is shown in FIG. 1E.

Figure 1F:
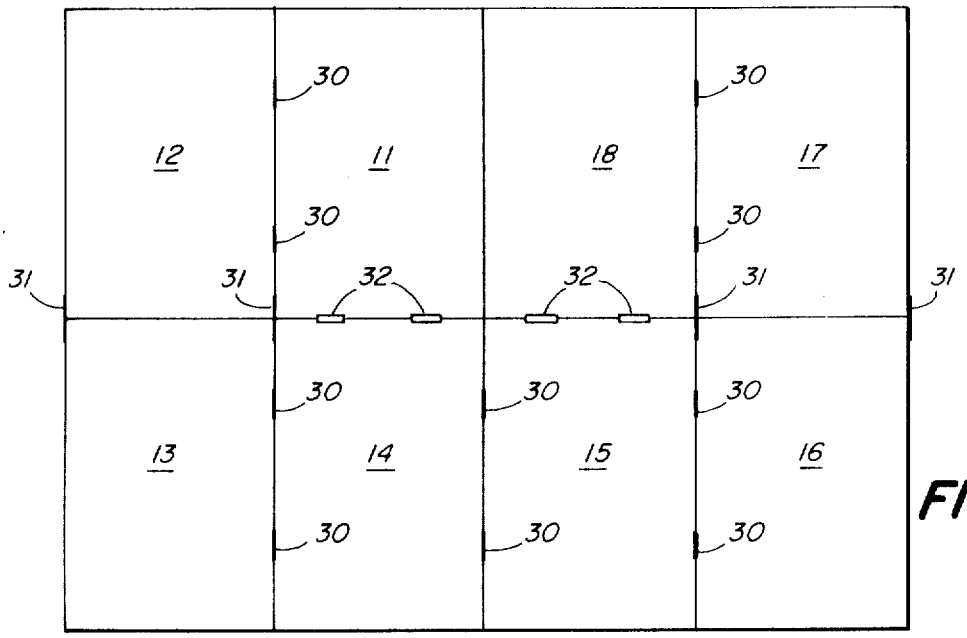
FIG. 1F is a front view of the panel display system showing the system completely opened.

In FIG. 1F the panel display system 10 is shown completely open so that panel assemblies 11 through 18 inclusive form a rectangular display system four panel assemblies wide and two panel assemblies high. Also, hinging devices 30 and 31 are schematically shown throughout the display system. Between panel assemblies 11, 18 and 14, 15 respectively are holding alignment devices 32 which prevent the upper panel assemblies from slipping off the supporting lower panel assemblies 14 and 15.

Figure 2:
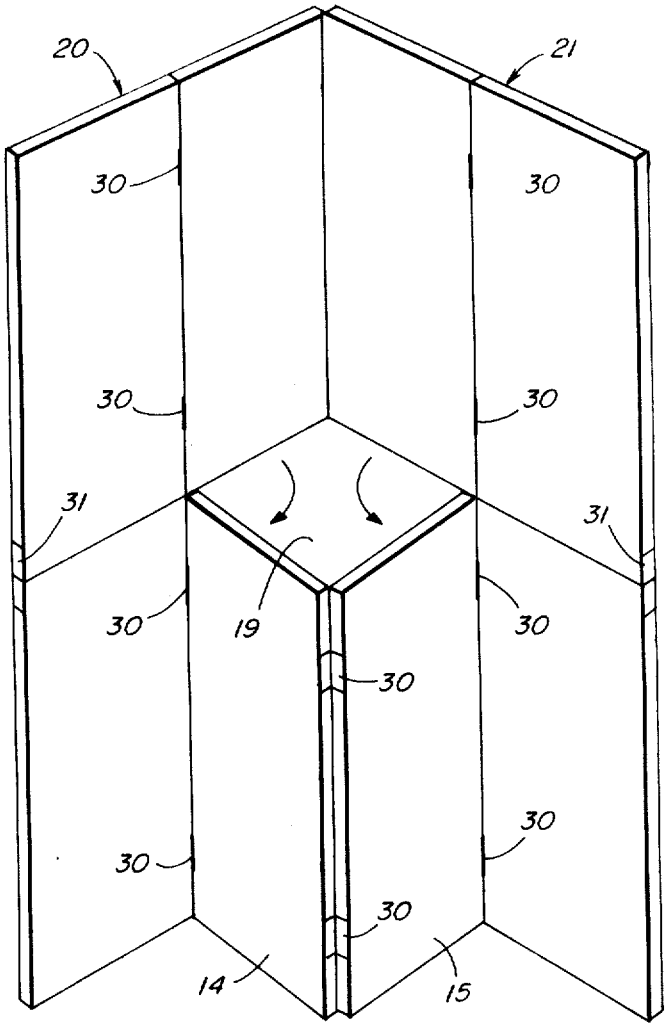
FIG. 2 is a perspective view of the display system wherein each panel assembly group is partially opened to form a display system having a shelf.

FIG. 2 shows a preferred embodiment of the panel display system wherein panel assembly group 20 is arranged at a 90° angle relative to panel assembly group 21. Panel assemblies 14 and 15 are shown protruding from the remaining panel assemblies and thus form a shelf area 19. This configuration of panel assemblies provides the necessary display area as well as providing a shelf for the display of particular products and the like. The shelf that fits into shelf area 19 is a common shelving device not shown in FIG. 2. It can be appreciated by those skilled in the art that the panel assemblies can be positioned to form various display configurations now shown in FIGS. 1A–F and FIG. 2.

Figure 3:
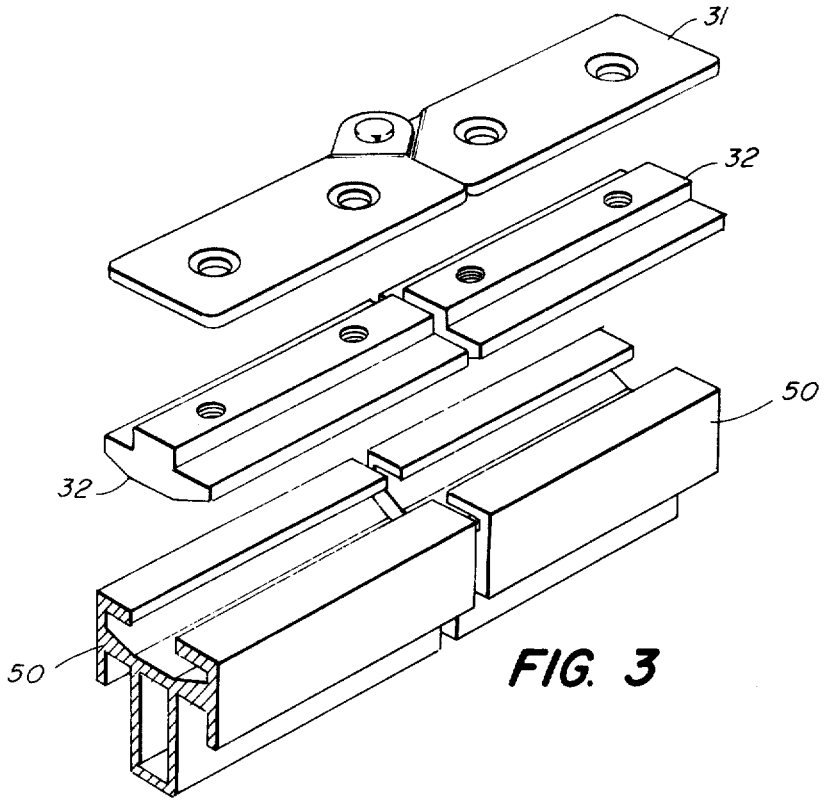
FIG. 3 is a perspective view of a corner hinging device with its slot inserts and corresponding border strip.

In FIG. 3 is shown a perspective view of hinging device 31 which is attached to slot insert 32. Slot insert 32 is inserted into slot 51 of border strip 50 as more fully detailed below. Hinging device 31 is attached to slot insert 32 by screw means, not shown, known to those skilled in the art. Hinging device 31 is located along the upper edge of panel assemblies 12 and 13, and similarly between panel assemblies 16 and 17. These hinging devices 31 provide the necessary movable support means by which the panel assemblies are enabled to be moved upward or downward.

Figure 4:
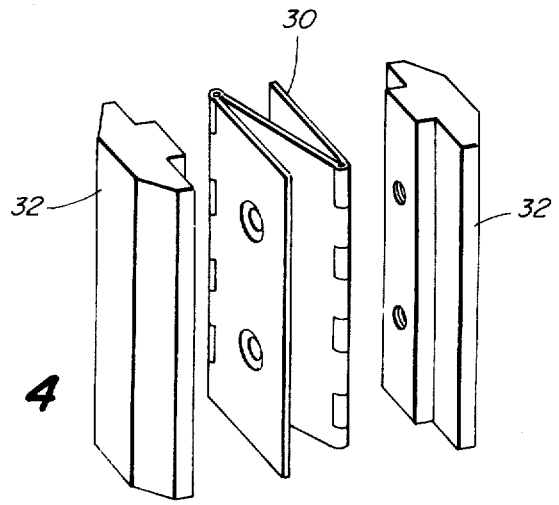
FIG. 4 is a perspective view of a two-way hinging device and corresponding slot inserts.

Hinging device 30, shown in FIG. 4, with its corresponding slot inserts 32, is mounted on the vertical edges of the panel assemblies so that each panel assembly is able to move horizontally outward from its confronting panel assembly. For example, the movement of panel assemblies shown in FIGS. 1D, 1E and 1F utilizes hinging device 30.

Figure 4A:
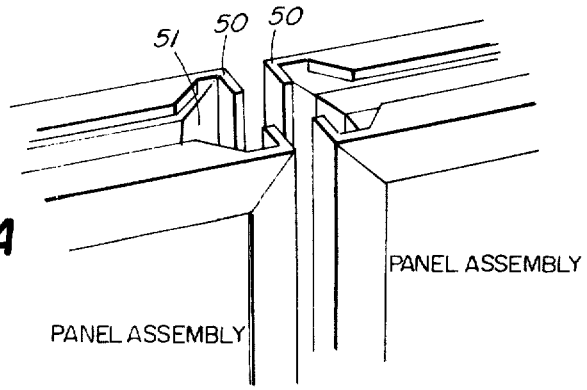
FIG. 4A is a perspective view of two panel assemblies having border strips along their confronting surfaces.

In FIG. 4A is shown two substantially parallel and confronting panel assemblies having border strip devices 50 confronting each other. The slot portions 51 of border strip 50 extend substantially the entire length of border strip 50 and receive the slot insert 32 shown in FIG. 4. Mounted to each slot insert 32 is hinging device 30, in a conventional manner. Thus, the hinging device 30 is positioned between the confronting border strips 50 of each panel assembly as shown in FIGS. 1A-F.

It can be appreciated by those skilled in the art that hinging devices 30 and 31 may comprise numerous configurations which may or may not utilize the slot inserts 32. Those hinging devices not utilizing slot inserts 32 would be attached directly to each border strip device 50 by screws and the like.

Figure 5A:
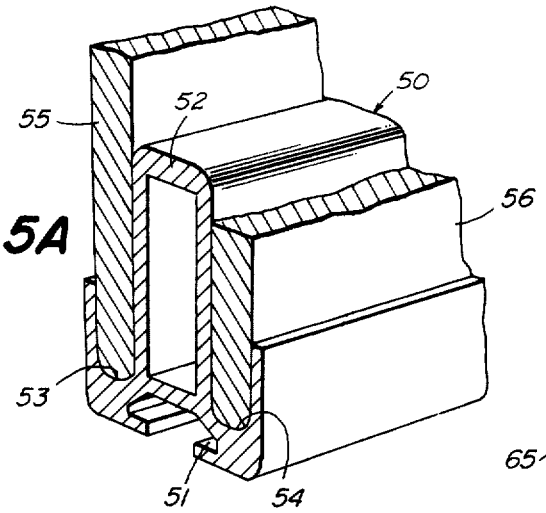
FIG. 5A is a perspective view of a border strip device having a longitudinal slot for connection to a hinging device.
Figure 5B:
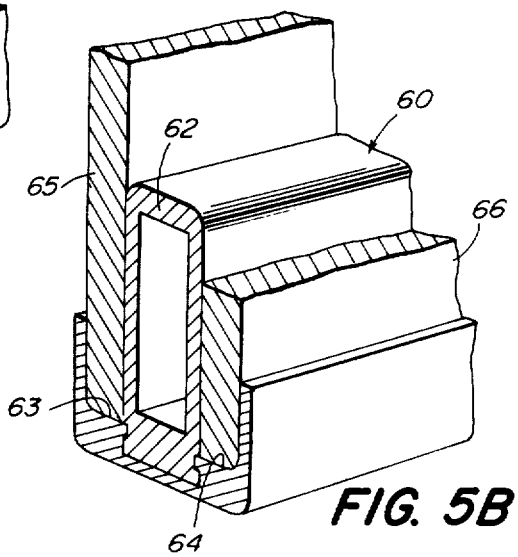
FIG. 5B is a perspective view of a border strip device without a longitudinal slot.

In FIGS. 5A and 5B are shown two preferred embodiments of the bordering strip devices as mentioned above. In FIG. 5A is shown bordering strip device 50 having a slot portion 51, a center support portion 52, and grooves 53 and 54. This particular border strip 50 is utilized on those edges of the panel assemblies which require the presence of hinging devices 30. Within grooves 53 and 54 are positioned wall boards 55 and 56 respectively, which form each panel assembly in the display system. Each panel assembly is made up of two parallel and confronting wall boards with a border strip device positioned along the four sides of the wall board. The center support 52 provides structural support to maintain the recess or separation between the wall boards so that each panel assembly structure has greater depth and thus is stable as well as lightweight.

The slot portion 51 of border strip device 50 not only provides a means for attaching hinging devices 30 to the border strip, but can also be utilized to attach other devices to the display system, such as spot lights and the like. Such devices would have appropriate slot inserts and means to attach the devices to the slot inserts as known by those skilled in the art.

For those sides of each panel assembly which do not have a hinging device attached, border strip 60 is utilized as shown in FIG. 5B. Border strip 60 comprises grooves 63 and 64 which hold wall boards 65 and 66 respectively in a parallel and confronting arrangement and form the outermost portion of the strip. Center support 62 serves the identical purpose as center support 52, shown in device 50. That is, it provides structural support to each panel assembly as well as allowing each panel assembly to be substantially hollow and thus lightweight. Accordingly, the existence of center support 62 provides a greater depth to each panel assembly and thus greater structural stability.

The outermost portion of border strip 60 comprising grooves 63 and 64 is detachable from the center support portion 62 as shown by the sectional lines in FIG. 5B. It can be appreciated by those skilled in the art that there are numerous ways of providing detachable support means between the center and outermost portions of the strip. One such configuration is shown in FIG. 5B where the center portion 62 has an indented portion on both vertical walls while the outermost portion has a corresponding protruding portion. The outermost portion in border strip 60 is detached from center support 62 when used along the upper horizontal edge of each panel assembly. Thus, wall boards 65 and 66 can be removed and replaced with new wallboards merely by separation of border strip device 60.

Border strip devices 50 and 60 are typically made of a lightweight material such as aluminum or a clear plastic. Other materials are known which can be used by those skilled in the art.

The wallboards 55, 56 and 65, 66 are typically made of a flame-retardant lightweight cardboard material or the like upon which display information is printed or attached. Wood, plastic or other material can also be used, depending upon the user's weight and structural requirements.

Figure 6:
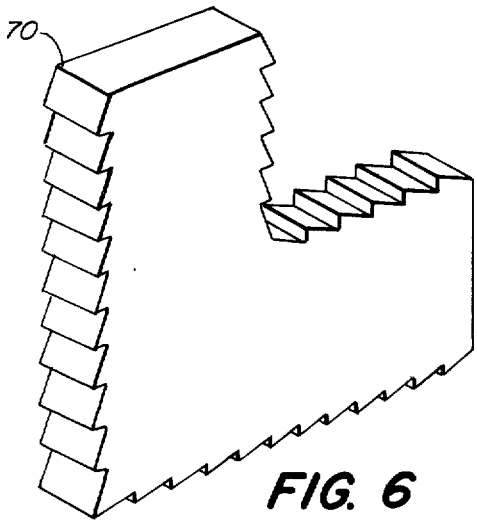
FIG. 6 is a perspective view of a locking device for use with the border strip devices.

In FIG. 6 is shown a locking device 70 which is used to connect two border strip devices at their 90° corners. At each corner, the border strip 50 or 60 is mitered to form a strong and aesthetically pleasing corner. The device 70 is inserted into the center portion 52 or 62 of the mitered border strip and thus locks the two intersecting strips to each other. Along the edges of device 70 is a serrated pattern which increases the friction between the locking device and border strip.

I claim:

1. A portable display system comprising:

a plurality of panels each having a detachable front wallboard and detachable rear wallboard;

a first and second peripheral support means to support and position said detachable front and rear wallboard in a substantially parallel and confronting relationship so as to form a panel assembly; said first peripheral support means removably positioned along at least one outer edge of said detachable front and rear wallboard, said second peripheral support means positioned along the remaining edges of said detachable front and rear wallboard so that said detachable front and rear wallboard is removable from said first and second peripheral support means in a direction perpendicular to the edge along which said first peripheral support means is positioned, hinging means for connecting a plurality of said panel assemblies to each other so that said panel assemblies are divided into a first and second group;

said hinging means comprising a plurality of corner hinges greater than two and a plurality of double hinges greater than two so that said corner hinges are connected to a plurality of said panel assemblies movable in a vertical direction and said double hinges connected to a plurality of said panel assemblies movable in a horizontal direction, said first and second group comprising a number of connected panel assemblies such that said number of connected panel assemblies are hinged in the said two directions so that in the extended position the number of panel assemblies extending in the vertical direction equals the number of panel assemblies extending in the horizontal direction, said first group being extended to said position independent of said second group.

2. A portable display system in accordance with claim 1 wherein the plurality of panel assemblies comprises eight rectangularly shaped panel assemblies.

3. A portable display system in accordance with claim 1 wherein said second peripheral support means comprises an elongated border strip device having two elongated substantially parallel channels which extend substantially the entire length of said border strip device, so that an outer edge of said detachable front wallboard and said detachable rear wallboard is positioned within said channels, said channels having substantially parallel and confronting interior walls which are connected at their upper and lower ends to form a center support structure; said center support structure defining means to receive a locking device for securing a first border strip device to a second border strip device;

an elongated slot extending the entire length of said border strip device formed along a surface opposite from said channel surfaces and said center support structure, said slot being positioned opposite said center support structure.

4. A portable display system in accordance with claim 3 wherein said corner hinge is connected to a first and second slot insert device, said first and second slot insert devices being positioned within the elongated slots of their respective second peripheral support means devices.

5. A portable display system in accordance with claim 3 wherein said double hinge device is connected to a first and second slot insert device, said first and second slot insert devices being positioned within the elongated slots of their respective second peripheral support means devices.

6. A portable display system in accordance with claim 1 wherein said second peripheral support means comprises an elongated border strip device having two elongated, substantially parallel channels extending substantially the entire length of said border strip device, so that an outer edge of said detachable front wallboard and said detachable rear wallboard is positioned within said channels, said channels having substantially parallel and confronting interior walls which are connected at its upper and lower ends to form a center support structure, said center support structure defining means to receive a locking device for securing a first border strip device to a second border strip device.

7. A portable display system in accordance with claim 1 wherein said first peripheral support means comprises an elongated border strip device having a first portion comprising two elongated, substantially parallel channels extending substantially the entire length of said border strip device so that an outer edge of said detachable front wallboard and said detachable rear wallboard is positioned within said channels, a second portion having four elongated walls joined to form a hollow tubular center support structure, said four elongated walls further comprising two confronting interior walls of said channels and two horizontal walls connected at the upper and lower ends of said confronting interior walls, said center support structure defining means to receive a locking device for securing a first border strip device to a second border strip device, said first portion and second portion having detachable means so that said first portion can be detached from said second portion.

8. A portable display system in accordance with claim 7 wherein said detachable means comprises a plurality of protruding elongated lips which are parallel and confronting on said first portion, a plurality of elongated recesses on said second portion which confronts said elongated lips on said first portion to provide a detachable support mechanism.

9. A portable display system comprising a plurality of panel assemblies, each panel assembly comprising two parallel and confronting detachable wallboards, and a first and second border strip device along the perimeter edges of said detachable wallboards;

said first border strip device positioned along at least one perimeter edge of said detachable wallboards and having a first portion comprising two parallel grooves extending substantially the entire length of the device separated by a second portion being a hollow tubular structure said first portion being the entire outer surface of said first border strip device and being detachable from said second portion, said second portion remaining fixed in said display system so that said detachable wallboards are removable from said first and second border strip devices in a direction perpendicular to the edge along which said first border strip is positioned, said second border strip device positioned along the remaining perimeter edges of said detachable wallboards and having two parallel grooves extending substantially the entire length of the device separated by a hollow tubular structure;

hinging means for connecting a plurality of said panel assemblies to each other so that said panel assemblies are divided into a first and second group;

said hinging means comprising a plurality of corner hinges greater than two and a plurality of double hinges greater than two so that said corner hinges are connected to a plurality of said panel assemblies movable in a vertical direction and said double hinges connected to a plurality of said panel assemblies movable in a horizontal direction, said first and second group comprising a number of connected panel assemblies such that said number of connected panel assemblies are hinged in the said two directions so that in the extended position the number of panel assemblies extending in the vertical direction equals the number of panel assemblies extending in the horizontal direction, said first group being extended to said position independent of said second group.

*10. A lightweight portable display system comprising, a plurality of lightweight planar panels each comprising slideably removable front board and a slideably removable rear board, a first and second peripheral support means to support and position said removable front and rear boards in a substantially parallel and confronting relationship so as to form a panel assembly said first peripheral support means removably positioned along at least one outer edge of said removable front and rear boards, said second peripheral support means positioned along the remaining edges of said removable front and rear boards so that said removable front and rear boards are removable from said second peripheral support means by detachment of said first peripheral support means, and by sliding said front and rear boards along said second peripheral support means, hinging means for connecting the panel assemblies to each other so that the panel assemblies can be folded between open and closed positions, wherein in said closed position all panel assemblies are compactly folded in a parallel array for ease of portability, said second peripheral support means comprising an elongated border strip member having two elongated substantially parallel channels which extend substantially the entire length of said border strip member, so that an outer edge of said removable front board and rear board is positioned respectively within said channels, said channels forming guides to enable the slideably removal of the front and rear boards, said channels having substantially parallel and confronting wall surfaces forming a center support structure, said center support structure having means to receive a locking device for securing adjacent border strip members, said border strip member having an elongated slot extending the length of said member formed along a surface opposite from said channels and said center support structure, said slot for receiving at least part of said hinging means.*

*11. A portable display system in accordance with claim 10 wherein said hinging means comprise a plurality of corner hinges and a plurality of double hinges.*

*12. A portable display system in accordance with claim 10 wherein said hinging means comprises a hinge and a slot*

*insert, said slot insert accommodated in said slot and means for securing the slot insert in the slot.*

*13. A portable display system in accordance with claim 10 wherein the center support structure is hollow.*

*14. A portable display system in accordance with claim 10 wherein said first peripheral support means also comprises an elongated border strip member having a first portion comprising means defining two elongated parallel channels for receiving the boards and a second portion mateable with the first portion but detachable therefrom to permit removal of the boards.*

*15. A portable display system in accordance with claim 10 wherein said first peripheral support means comprises an elongated border strip member having a first portion comprising two parallel channels extending substantially the entire length of said border strip member for receiving the boards, and a second portion having walls joined to form a hollow center support structure, said structure further having locking means for locking the first and second portions of the border strip member.*

*16. A lightweight portable display system comprising, a plurality of lightweight planar panels each comprising a slideably removable front board and slideably removable rear board, first and second peripheral support means to support and position said removable front and rear boards in a substantially parallel and confronting relationship so as to form a panel assembly said first peripheral support means removably positioned along at least one outer edge of said removable front and rear boards, said second peripheral support means positioned along the remaining edges of said removable front and rear boards so that said removable front and rear boards are removable from said second peripheral support means by detachment of said first peripheral support means, and by sliding said front and rear boards along said second peripheral support means, hinging means for connecting the panel assemblies to each other so that the panel assemblies can be folded between open and closed positions, wherein in said closed position all panel assemblies are compactly folded in a parallel array for ease of portability, said second peripheral support means comprising an elongated border strip member having two elongated substantially parallel channels which extend along the length of said border strip member whereby an edge of said removable boards is positioned in respective channels, said channels forming guides to enable the slideable removal of the front and rear boards, said channels formed at least in part by a center support section for spacing the boards from each other, said elongated border strip member also having means for receiving at least a part of said hinging means, said first peripheral support means comprising an elongated border strip member having a first portion at least in part forming elongated parallel channels for the board edges and a second portion normally detachable from the first portion, whereby when the second portion is detached the front and rear boards are readily slideably removable along said channels of the border strip of said second peripheral support means.*

*17. A portable display system in accordance with claim 16 wherein said first portion comprises a center support structure defining on opposite sides thereof a wall of each channel, the opposite wall of each channel being defined by a wall of the second portion.*

*18. A portable display system in accordance with claim 17 wherein the second portion has a U-shaped cross-section.*

*19. A portable display system in accordance with claim 17 wherein said first and second portions have mating sections enabling the second portion to be detached from the first portion for removal of the boards.*

*20. A lightweight portable display comprising, at least one panel assembly comprising a slideably removable front board and a slideably removable rear board, first and second peripheral support means to support and position said removable front and rear boards in a substantially parallel and confronting relationship so as to form the panel assembly, said first peripheral support means removably positioned along at least one outer edge of said removable front and rear boards, said second peripheral support means positioned along the remaining edges of said removable front and rear boards so that said removable front and rear boards are removable from said second peripheral support means by detachment of said first peripheral support means, and by sliding said front and rear boards along said second peripheral support means, said second peripheral support means comprising an elongated border strip member having two elongated substantially parallel channels which extend substantially the entire length of said border strip member, so that an outer edge of said removable front board and rear board is positioned respectively within said channels, said channels formed at least in part by a center support section for spacing the boards from each other, said first peripheral support means comprising an elongated border strip member having a first portion at least in part forming elongated parallel channels for the board edges and a second portion detachable from the first portion whereby when the second portion is detached, front and rear boards are readily slideably removable along said channels of the border strip of said second peripheral support means.*

*21. A portable display in accordance with claim 20 wherein the first portion comprises a center support structure defining on opposite sides thereof a wall of each channel, the opposite wall of each channel being defined by a wall of second portion.*

*22. A portable display in accordance with claim 21 wherein the second portion has a U-shaped cross-section.*

*23. A portable display in accordance with claim 21 wherein the first and second portions have mating sections enabling the second portion to be detached from the first portion for removal of the boards.*

*24. A portable display system in accordance with claim 10 wherein the front and rear boards are individually removable.*

*25. A portable display system in accordance with claim 24 wherein the front board may be removed without disturbing the rear board and vice versa.*

*26. A portable display system in accordance with claim 25 wherein there is provided a void space between the front and rear boards so as to make the panel assembly as light in weight as possible.*

*27. A portable display system in accordance with claim 26 wherein the channel is U-shaped so as to provide a guideway for the slideable boards.*

*28. A portable display system in accordance with claim 24 wherein said border strip means of the second peripheral support means is an integral single piece member having the center support structure on one edge and having the elongated slot along an opposite edge.*

*29. A portable display system in accordance with claim 16 wherein said border strip means of the first peripheral support means has the first portion on one side forming the center support section and a part of the channel and on the other side having means for receiving the second portion, said second portion forming another part of the channel.*

*30. A portable display system in accordance with claim 10 wherein the front and rear boards are easily removed and replaced with new wallboard containing new display information.*

* * * * *